Nov. 28, 1967  G. H. HOSKINSON  3,355,254
WASTE PRODUCTS COMBUSTION APPARATUS
Filed April 26, 1966  5 Sheets-Sheet 4

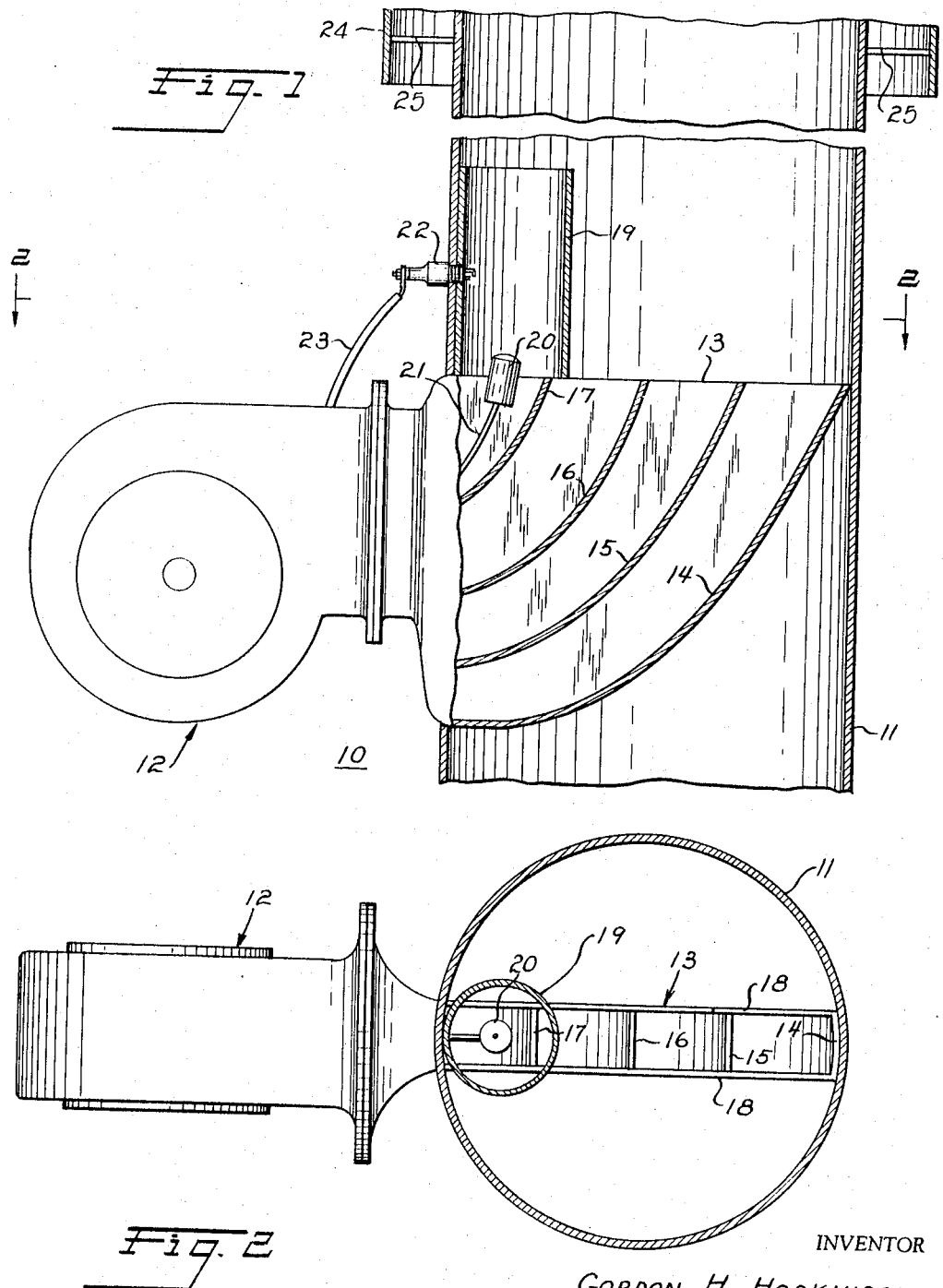

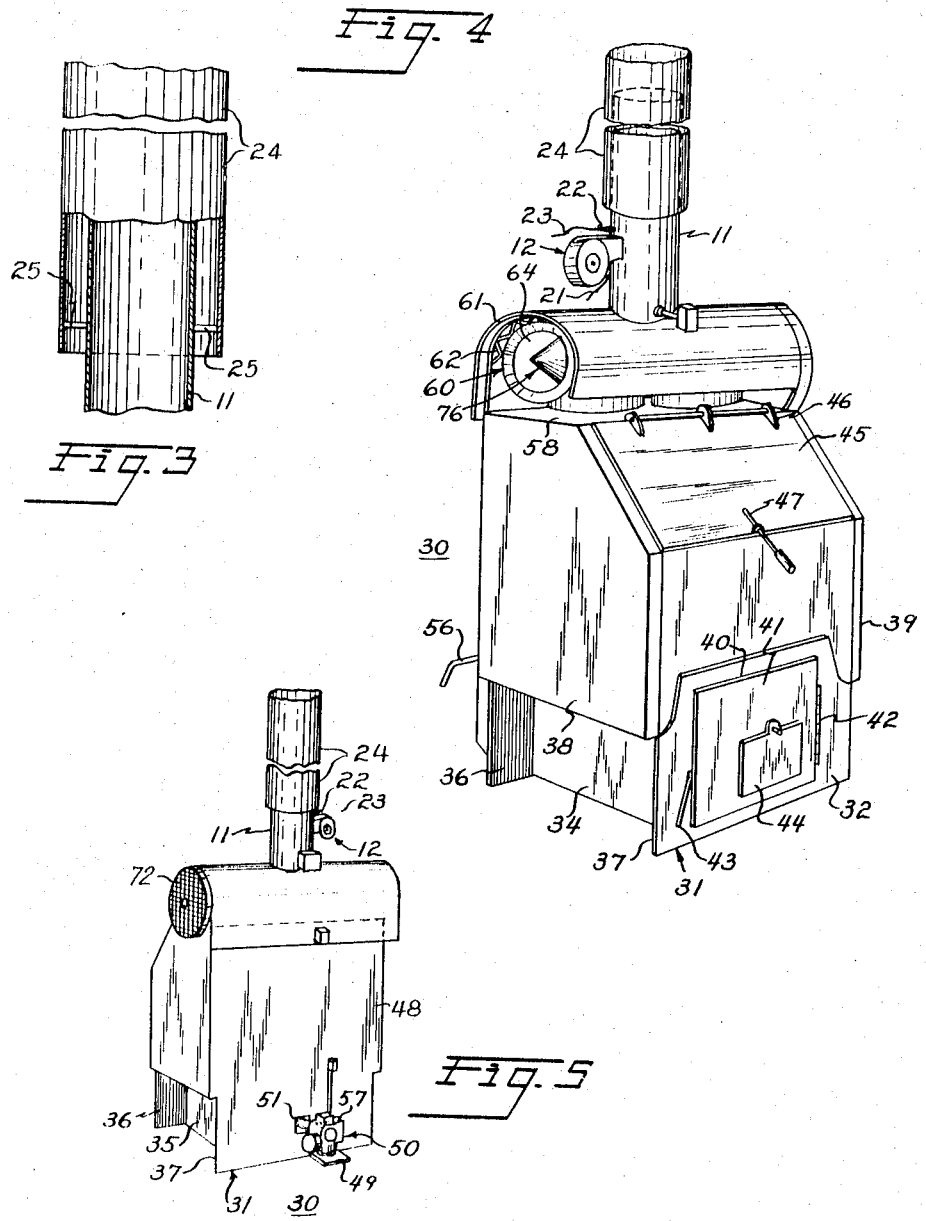

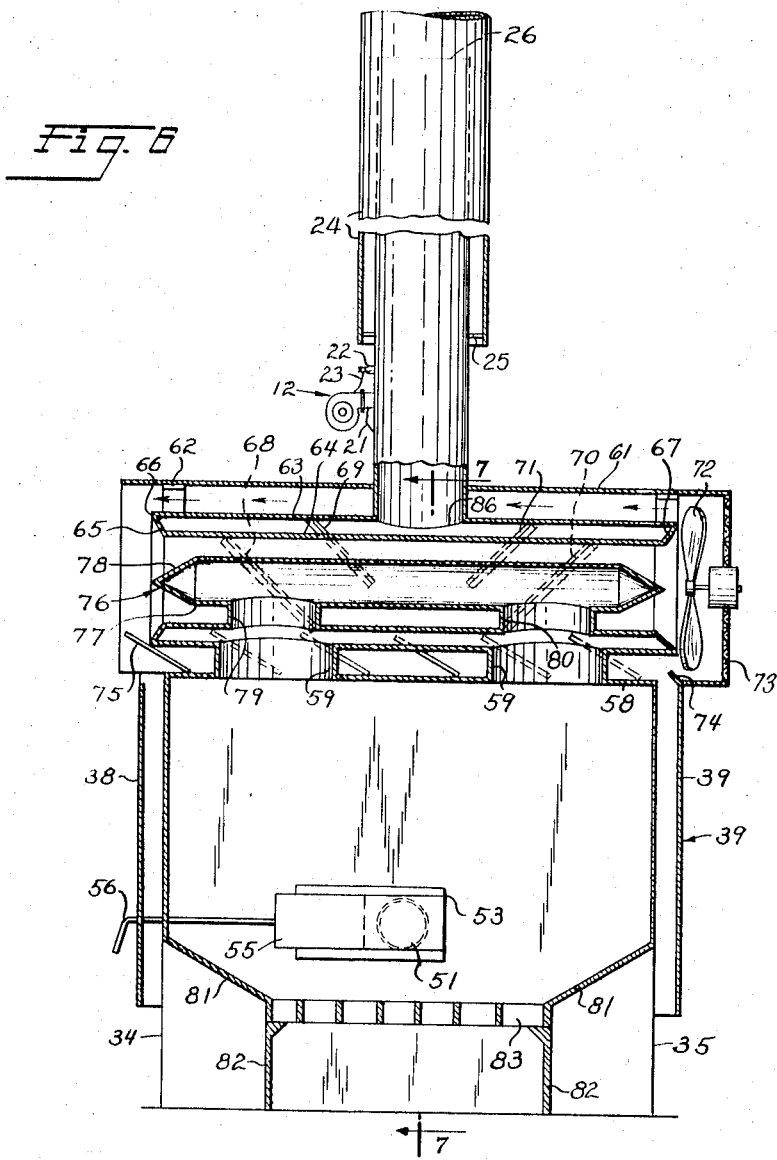

INVENTOR.
GORDON H. HOSKINSON

INVENTOR
GORDON H. HOSKINSON

United States Patent Office 3,355,254
Patented Nov. 28, 1967

3,355,254
WASTE PRODUCTS COMBUSTION APPARATUS
Gordon H. Hoskinson, Floral Park, N.Y., assignor to Cornell-Hoskinson Mfg. Corp., Long Island City, N.Y., a corporation of New York
Filed Apr. 26, 1966, Ser. No. 545,353
2 Claims. (Cl. 23—277)

ABSTRACT OF THE DISCLOSURE

The invention is directed to apparatus for effecting the burning of waste products of combustion in two separate stages in an inner and outer exhaust stack assembly. The waste products of combustion are mixed with air and fuel and are ignited and burned in an inner stack member lined with a refractory material. The upper end of the inner stack member is provided with air inlet means through which air is passed to further control the burning in the inner stack member. An outer stack member of greater length than the inner stack member is connected thereto in circumferentially spaced enveloping relationship with respect to the inner stack member and forms an air chamber therebetween wherein fresh air is passed and is heated by heat exchange relationship with the inner exhaust stack member, with the fresh air mixing with the waste products of combustion passing from the inner stack member for effecting a further burning thereof in the upper end of the outer exhaust stack.

---

The present invention relates to burning apparatus, and to fire burning apparatus to effect the consumption of smoke or gases, or other obnoxious vapors generated therein prior to the emission of such smoke, gases or the like to the atmosphere, and to the method for consumption of such smoke, gases, or other vapors, and is a continuation-in-part of my application Ser. No. 370,391, filed May 6, 1964, now U.S. Patent No. 3,248,178, which, in turn, is a continuation of my application Ser. No. 37,722, filed June 21, 1960, and now abandoned.

A problem that has been present in fire burning apparatus and the like since time immemorial is that of smoke, gases, and other waste products of combustion being emitted from the burning of materials in industrial production or manufacture, burning of fuels to provide heat, disposal of waste materials or the like by burning thereof in incinerators and other similar operations wherein combustible materials are exhumed by burning. Such smoke, gases, obnoxious fumes and other waste products of combustion are quite hazardous to the health of the community in general. This has become particularly troublesome due to the ever-increasing technological advancement of our industries. Moreover, such waste products of combustion also create an economical problem with respect to maintenance or property in general in the area of burning due to the fact that such products of combustion not only soil everything with which they come into contact, but also tend to enhance deterioration of the physical property.

The waste products of combustion which are primarily objected to are in the form of unburned carbon which gives rise to the heavy dark smoke and gases and other obnoxious vapors generated during the burning operation. The large amount of carbon present in the waste products of combustion as well as the generated gases, vapors, and the like, is due to the incomplete or inefficient combustion during the actual burning of the materials. The inefficient or insufficient combustion may be due to the structure of the apparatus in which the materials burn, or as a result of insufficient heat in the burning zone to effect an efficient operation, or insufficient oxygen to support the desired degree of combustion which will insure a complete consumption of the material being burned, or a combination of all three.

Considerable time, effort, and money have been expended over a great many years to develop burning apparatus which will function in a more efficient manner and which will provide a more efficient and effective combustion due to increased oxidation and temperature. Moreover, auxiliary attachments have been developed for burning apparatus in an effort to effect a more efficient and more nearly complete consumption of the waste materials. However, all of these prior attempts to date have not been completely satisfactory in a great many respects, and the problem basically is still present.

In the elimination of the foregoing and related disadvantages, it is therefore a principal object of the present invention to provide fire burning apparatus of a new and novel structure which effects a more efficient operation than heretofore possible.

Another object of the persent invention is the provision of fire burning apparatus which eliminates the emission of obnoxious waste products of combustion to the outside atmosphere, but is extremely simple in design and low in initial cost.

A still further object of the present invention is the provision of apparatus that may be associated with existing fire burning equipment which will completely eliminate the emission of obnoxious or waste products of combustion to the outside atmosphere.

Yet another object of the present invention is the provision of apparatus that may be associated with industrial exhaust stacks which will eliminate the emission of obnoxious gases, vapors, smoke, and the like to the outside atmosphere.

Yet another object of the present invention is the provision of a fire burning apparatus that does not emit obnoxious waste products of combustion to the outside atmosphere, and which is also capable of being convertible from a furnace proper to an incinerator proper in a matter of seconds.

Still another object of the present invention is the provision of a fire burning apparatus that does not permit the emission of obnoxious waste products of combustion to the outside atmosphere, and which functions not only as an incinerator, but at the same time can be employed to provide heat to any particular area.

Another object of the present invention is the provision of apparatus in association with a heat exchange unit which can be mounted on existing fire burning apparatus, which will eliminate the emission of obnoxious waste products of combustion to the outside atmosphere.

Still another object of the present invention is the provision of fire burning apparatus which will insure a substantially complete combustion of the objectionable waste products of combustion wherein the products emitted therefrom will not be harmful.

Yet another object of the present invention is the provision of fire burning apparatus that is extremely efficient in effecting the complete combustion of the materials being burned wherein no objectionable waste products of combustion will be emitted to the outside atmosphere.

Another object of the present invention is the provision of fire burning apparatus wherein the waste products of combustion will be consumed prior to the emission of same to the outside atmosphere.

Yet another object of the present invention is the provision of a stack construction which will prevent burning out of the lower portion of the inner stack member of the stack construction.

Other and additional objects of the present invention will become manifest from the ensuing description taken in conjunction with the accompanying drawings.

In effecting the objects of the present invention, apparatus is associated with an exhaust chimney or the like, either as a complete unit or as a supplementary unit. The apparatus includes a primary combustion chamber having associated therewith a fan or blower and igniter means, and an outer chimney member adapted to form a secondary combustion in a subsequent air preheated chamber. It will be found advantageous in many instances to incorporate a heat exchanger with the apparatus in carrying the invention into effect.

By way of illustration, an extension pipe or pipe piece is fitted to the top of the flue or chimney and is of a predetermined length and will serve to provide a primary combustion chamber. Associated with the primary combustion chamber is a power driven fan or blower whose outlet opens into the chamber, and during operation serves to increase the chimney draft. An igniter device of any suitable well known kind, such as, for example, gas, atomized oil, or the like may be used. If the existing chimney is of sufficient height, the extension pipe or pipe piece may be eliminated, and the fan or blower and the igniter may be mounted in the existing chimney.

A secondary tube or member is mounted in spaced enveloping relationship to the primary combustion member or the existing chimney to provide an air inlet space between the outer and inner surfaces of the inner pipe member and the outer pipe member. The outlet end of the secondary or outer pipe member is located at a suitable height above the outlet or terminal end of the inner pipe member to serve as a chimney top.

Waste products of combustion rise from the existing furnace or furnace burning area thereof into the customary outlet and flows upwardly to the primary combustion chamber wherein increased air is supplied by the induced draft of the fan. During the mixing of the waste products of combustion and the air induced by the fan means, ignition of the mixture takes place and a flame is produced inside the chimney or pipe extension to effect a further burning of the products of combustion. The remaining products of combustion emerging from the burning of the smoke and the air mixture in the primary combustion zone pass upwardly through the inner pipe. However, such remaining products of combustion cannot be further burned in the inner stack due to lack of oxygen. However, as such products emerge from the top end of the inner pipe, the products of combustion come into contact with air rising upwardly in the spaced air chamber formed between the inner and outer pipes. The air rising in the air space becomes heated through heat exchange relationship with the inner pipe, and upon mixing with the further waste products of combustion as they emerge from the exit end of the inner pipe, mix with the fresh hot air and effect a further burning thereof. Thus when the waste products of combustion of the original fire burning area eventually reach the chimney top or exit formed by the open end of the secondary tube, total combustion has been accomplished and all visible gases have been burned or consumed, and toxic or obnoxious fumes and the like have been decomposed into harmless gases which may be passed to the outside atmosphere without fear of harm to person or property.

Broadly stated, the means for eliminating the emission of objectionable waste products of combustion to the outside atmosphere comprises first stack means, draft inducing means secured to said stack means adjacent its lower end thereof, fuel ignition means secured to said first chimney means in close association with said draft inducing means, fuel feeding means for feeding fuel to said igniter means, and second stack means mounted to said first stack means in spaced enveloping relationship therewith, the lower entrance end of said second stack means being positioned above said draft inducing means and said ignition means, being positioned above said draft inducing means and said ignition means, the exit end of said second stack means terminating at a point above the exit end of said first stack means.

To the accomplishment of the foregoing and related ends, the present invention then consists of the means hereinafter fully described and particularly pointed out in the claims, the annexed drawings and the following description setting forth in detail certain means in the carrying out of the invention, such disclosed means illustrating, however, but one of various ways in which the principle of the invention may be employed.

The present invention is illustrated, by way of example, in the accompanying drawings, in which:

FIGURE 1 is an enlarged side elevation partly in cross section of an illustrative form of stack structure made in accordance with the present invention and illustrating the means for igniting the waste products of combustion in the lower portion of the inner stack.

FIG. 2 is a cross sectional view taken on lines 2—2 of FIG. 1.

FIG. 3 is a fragmentary side elevation in cross-section of the upper end of the inner stack and the outer stack illustrating the attainment of further burning of the waste products of combustion.

FIG. 4 is a front perspective view of fire burning apparatus utilizing the smoke burning unit shown in FIGS. 1–3.

FIG. 5 is a rear perspective view of the fire burning apparatus shown in FIG. 4.

FIG. 6 is a front view in cross-section of the fire burning apparatus of FIGS. 4 and 5 showing the inner construction of the fire burning apparatus.

Figure 7:
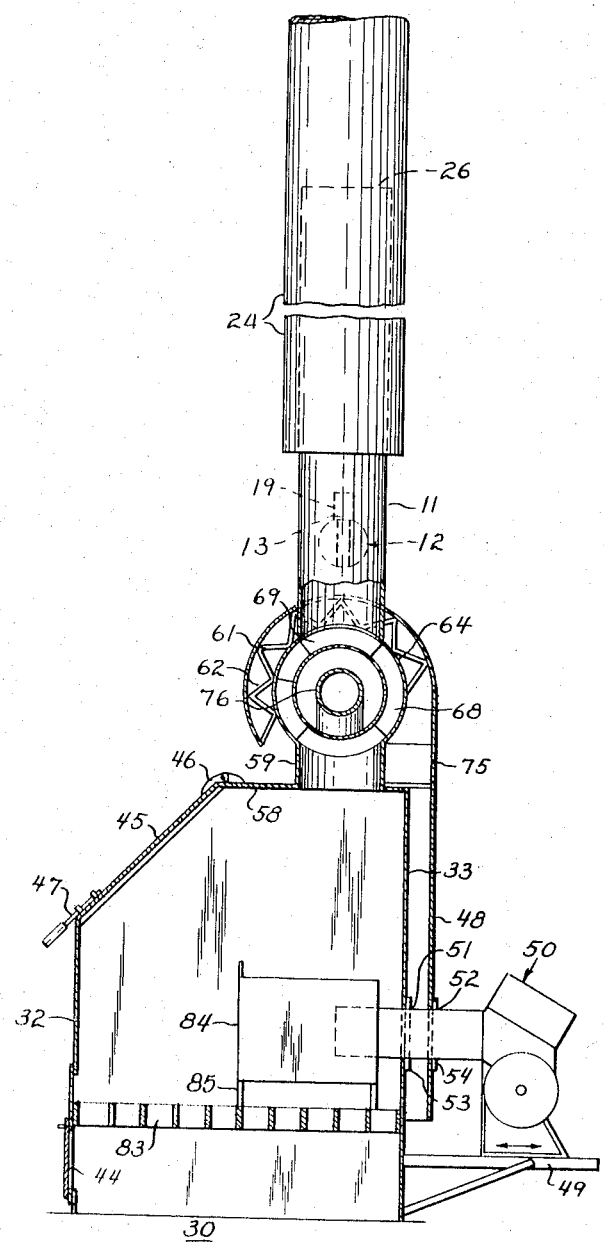
FIG. 7 is a cross-sectional view taken on lines 7—7 of FIG. 6.

Referring now to the drawings, and with particular reference to FIGS. 1–3, an illustrative embodiment of the apparatus for the elimination of the emission of obnoxious products of combustion to the atmosphere made in accordance with the present invention, and generally designated by reference numeral 10, is shown. The unit 10 comprises an inner cylindrical stack member 11 which may be made of steel, iron, or any other suitable metal from which exhaust stacks are normally made. The inner stack member 11 is to be connected at its lower end, as will be discussed more fully hereinafter, to the exhaust outlet of the fire burning apparatus, such as, for example, a stove, incinerator or similar burning equipment. The inner stack member 11 may be a conventional exhaust stack normally present on existing burner equipment. However, if the stack on the existing burner equipment is of insufficient diameter or does not possess sufficient heat, a proper stack or chimney may be substituted for the outlet of the fire burning equipment or may be added thereto. Moreover, it is to be understood that in the construction of new fire burning apparatus, the inner stack 11 of proper dimensions may be included with the fire burning apparatus as original equipment.

An air inducer or blower fan, generally designated by reference numeral 12, is mounted on the outside surface of the inner stack member 11 for access thereinto about the normal discharge outlet of the burner equipment proper. The blower fan 12 has access into the inner area of the inner stack member 11, and this may be accomplished by forming an opening in the stack which is in alignment with the operating opening of the blower fan 12. The draft inducer or blower fan 12 illustrated herein is of conventional design, and may be readily purchased on the open market. Accordingly, no detailed description thereof is believed necessary. It will suffice to say in connection with this that any mechanical means capable of continuously imparting a steady amount of air into the inner stack member 11 and at the same time effecting the desired draft inducement of the waste products of combustion may be employed in the present invention. The size of the blower fan to be employed in the present invention will vary, depending upon the capacity of the burner unit proper as well as the diameter of the inner stack member 11. Accordingly, any size blower fan may be employed which will effect the desired draft inducement of the waste products of combustion and at the same time deploy a sufficient amount of air into the inner stack member 11 for admixture with the rising waste products of combustion.

An air guide member, generally designated by reference numeral 13, is employed in association with the air blower fan 12 to direct and control the direction of the air being drawn into the inner stack member 11 and to aid in the creation of the draft for the waste products of combustion. As illustrated, the air guide member 13 includes a plurality of upwardly inclined arcuate plates 14, 15, 16, and 17, each of which is vertically spaced from one another and is of diminishing length with respect to one another. Each of the upwardly inclined arcuate plates 14, 15, 16, and 17 is united along each side edge to side plates 18. The lateral width, as hereinbefore indicated, of the plates 14, 15, 16, and 17 is relatively short in order to create the desired air action, and present no deterrent to the normal upward flow of the waste products of combustion, as well as assisting in the creation of the desired draft of same. This construction results in a narrow, upwardly inclined, arcuate, elongated plurality of passages in which the lower end of each is in association with the air blower 12, with each being vertically spaced one above the other through which air will be blown inwardly and upwardly for admixture with the products of combustion rising upwardly through the inner pipe member 11 from the fire burning unit proper.

The illustrated air guide member 13 may be secured at opposed points to the inner surface of the inner stack member 11 by spot welding, brazing, bolting, or in any desired manner. Alternatively, the air guide unit 13 may be bolted through the inner pipe member 11 to the housing of the air blower 12. The air guide member 13 may be made of any suitable metal, such as, for example, steel, cast iron, or similar metal. Preferably, the metal employed should be of sufficient strength and heat resistance in order to impart a long wearing life thereto, particularly since it is in the immediate area in which the hot products of combustion rising from the fire burning area proper are ignited and the area immediately thereabove serves as a secondary combustion chamber in which high heat will be generated.

The air guide member 13 just described is a particular and preferred construction for utilization in the present invention for directing air into the inner stack member 11 for admixture with the waste products of combustion passing upwardly therein, and to aid in the draft inducement thereof. However, it is to be clearly understood that there are other means which are readily available to one skilled in the art which can be employed in the present invention for accomplishing this purpose.

A small cylindrical fuel cup 19 is mounted to the inner surface of the inner stack member 11 and rests on the top surface of the air guide member 13 just above the inlet end of the blower fan 12. The fuel cup 19 is made of any suitable metal, such as, for example, steel or the like, but must possess a sufficient high resistance to heat, since it is within this area that fuel is ignited to create the secondary combustion zone, in a manner to be described more fully hereinafter. The fuel cup 19 need not necessarily be mounted directly to the inner surface of the inner stack member 11, but may be inwardly spaced slightly therefrom and secured to the top edges of the side plates 18 of the air guide member 13 by welding or the like.

The fuel cup 19 is preferred in the present invention since it provides a small area in which the fuel may be injected and ignited, in a manner to be more fully described hereinafter, without fear of any pre-ignition of the waste products of combustion and the air admixed therewith by means of the blower 12. That is to say, by the utilization of the fuel cup 19, there will be no ignition of the waste products of combustion until they reach the secondary combustion zone, which is in the immediate vicinity of the cup 19. However, it will be found possible under certain circumstances to eliminate the use of the fuel cup 19, such situations being where no pre-ignition of the waste products of combustion and air will create a problem. However, in general, a fuel cup 19 will be found advantageous to be included in the overall unit.

A fuel nozzle 20 for injecting the fuel within the fuel cup 19 is mounted in the bottom surface of the cup 19 and extends upwardly therein. The fuel nozzle 20 is of generally conventional design and is readily available on the open market, and therefore no detailed description of same is believed necessary. As shown, one end of the fuel nozzle 20 constitutes the exit end which is within the fuel cup 19, while the opposite end, which is outside thereof, is secured to a fuel inlet line 21 which extends through the inner stack member 11 and is connected to a suitable fuel source (not shown). The fuel to be employed in the present invention and to be dispensed from the fuel nozzle 20 may be any fuel that can be imparted into the fuel cup 19 in a jet or atomized state. Suitable fuels meeting these requirements are conventional fuel oil and gas, although any liquid or gaseous fuel capable of being dispensed in the manner indicated may be employed.

An igniter member 22 is mounted to the outside surface of the inner stack member 11 and extends through the wall thereof and through the wall of the fuel cup 19 and above the discharge end of the fuel nozzle 20. The igniter member 22 may be secured to the stack 11 in any suitable manner, such as, for example, by threading the openings in the wall of the inner stack member 11 and the fuel cup 19, and then threading the igniter member 22 thereinto. As illustrated, the igniter member 22 is in the form of a conventional spark plug which is threaded into the threaded openings of the inner stack member 11 and the fuel cup 19, with the spark gap end resting above this discharge end of the fuel nozzle 20. The opposite end of the spark plug 22, which is the contact or terminal end thereof, is connected to an electrical lead line 23, which is, in turn, connected to a suitable power source, such as, for example, a battery or the like, since the fuel igniter will only be used intermittently when needed to ignite the fuel dispensed into the fuel cup 19 by the fuel nozzle 20.

The construction just described results in a secondary combustion zone in which the waste products of combustion passing out of the outlet end of the fire burning unit proper will be admixed with air being blown thereinto and which will be burned in a comparatively small area by the fuel. This secondary combustion zone thus effects a further burning with fresh oxygen and fuel of products of combustion which would pass out to the atmosphere in a harmful or objectionable state. The assembly just described to effect the secondary combustion zone must not be positioned too far above the discharge outlet of the fire burning unit proper since it will be found advantageous in the overall efficiency of the unit to have the waste products of combustion to be burned still in a hot state with no heat being dissipated to the outside surface through the inner stack member 11.

To effect the ignition of the admixture of air and the waste products of combustion, it will be found desirable, in many instances, after a period of time in which the secondary combustion zone has been in operation, to cut off the fuel. This is possible due to the fact that the stack temperature in the immediate area of the secondary combustion zone will be sufficiently high to permit a self-ignition of the admixture of air and the waste products of combustion. It will be necessary, however, particularly under such circumstances, to have the secondary combustion zone in reasonably close proximity to the outlet end of the fire burning area proper in order to prevent any unnecessary heat loss. However, under general operation, it is preferred that the fuel be continuously burned during the operation of the unit.

The construction providing the secondary combustion zone for the waste products of combustion just described does result in a material burning or otherwise converting of the waste products of combustion. However, such products of combustion still are not in a state that they can be passed to the atmosphere without creating problems. Thus, in order to accomplish this desired result of rendering the ultimate waste products of combustion into a suitable state in which they can be expended into the outside atmosphere, a third combustion zone will be necessary to effect a further burning of the waste products of combustion before such products can be passed to the atmosphere.

To provide the third combustion zone, an outside stack 24 is secured to the inner stack 11 above the secondary combustion zone and extends upwardly therefrom in spaced enveloping relationship therewith. The outer stack 24 may be made of the same metal as the inner stack 11 and is secured thereto in spaced relationship by means of connecting rods or finger webs 25 secured therebetween at various convenient points. The webs 25 may be secured to the inner pipe 11 and the outer stack 24 by welding or the like. The outer stack member 24 extends upwardly and beyond the outlet end 26 of the inner stack member 11 and constitutes a final exit stack for the waste products of combustion. The outer stack member 24 is spaced circumferentially from the inner stack member 11 for a distance sufficient to provide a circumferential air channel or passageway therebetween in which air will rise vertically. Thus the formed air channel therebetween will provide air at the terminal or exit end 26 of the inner stack member 11, with this zone just above the terminal end of the inner stack member 11 constituting the third combustion zone to effect the final burning of the waste products of combustion such that they can be emitted to the atmosphere in a completely safe and substantially clean state.

In order to provide the third combustion zone, the outer stack member 24 must be of a sufficient height such that the air passageway formed between the inner stack member 11 and the outer stack member 24 will be sufficiently long to effect a proper heat transfer between the waste products of combustion generated in the secondary combustion zone in order to heat the air passing upwardly to such a temperature that self-ignition will be possible between the waste products of combustion passing from the exit end 26 of the inner stack member 11 and the incoming air converging therewith at the exit end. Thus the outer stack member 24 must not be spaced from the inner stack member 11 at too great a distance such that the volume of air passing upwardly therebetween in the formed air passage will be too large in volume to be heated. The spacing should be sufficient to permit a volume of air therein to support the further burning of the waste products of combustion, but will be of a volume insufficient to receive the heat transferred from the inner stack member 11 such that the air will not be heated to the required temperature. From the foregoing, it is believed obvious that the inner stack member 11 must be of a length and diameter and the outer stack member 24 must be so spaced with respect thereto that the heat transfer between the inner stack member 11 and the volume of air passing upwardly therebetween will be effected such that when the air passes above the terminal or exit end 26 of the inner stack member 11, the air will admix with the waste products of combustion and will be at a temperature such that the admixture will immediately ignite, thereby effecting the desired further burning of the waste products of combustion.

In the general operation of the stack unit described hereinbefore, the effect of the further burning or conversion of the waste products of combustion in the third combustion zone results in the final products of combustion being placed in a condition such that they can be passed to the atmosphere in a completely safe and unobjectionable state. The material to be burned is placed in a burner and ignited in a normal manner. After the material has started burning, the waste products of combustion rise upwardly through a conventional outlet and into the inner stack member 11. Fuel is fed through the fuel nozzle 20 and is ignited by means of the fuel ignition member 22. Simultaneously, the air blower fan 12 is set into operation, with air being blown upwardly and inwardly through the air guide member 13, which not only supplies the necessary air but also effects a draft inducement for the waste products of combustion. The air admixes with the waste products of combustion rising upwardly in the inner stack member 11 and are further burned, by means of the fuel from the fuel nozzle 20, thereby producing a hot secondary combustion zone. The remaining waste products of combustion that have not been consumed in the secondary combustion zone rise upwardly in the inner stack 11, with the high heat of the secondary combustion zone heating the inner stack member 11 such that air passing upwardly in the circumferential channel formed between the inner stack member 11 and the outer stack member 24 will be heated as it passes upwardly to a temperature sufficiently high to effect a self-ignition. As the hot air rises upwardly through the circumferentially formed passageway and the remaining waste products of combustion of the secondary combustion zone rise upwardly, the desired heat transfer is effected, and when the air combines with the waste products of combustion at the exit end 26 of the inner stack member 11, the admixture will be further burned to effect the final consumption or conversion of the remaining waste products of gas such that they can be passed upwardly through the outer stack member 24, and hence into the atmosphere in a completely unobjectionable and safe state.

Reference is now to be had to FIGS. 4–7 wherein an illustrative embodiment of heating apparatus utilizing the foregoing described unit made in accordance with the present invention, which eliminates any waste products of combustion being passed to the atmosphere in an objectionable state, is shown. In general, the basic construction shown in FIGS. 4–7, insofar as the heating apparatus unit is concerned, and for purposes of illustration only, is a heating unit made in accordance with the teachings set forth in my U.S. Patent No. 3,044,460, issued July 17, 1962. However, it is to be clearly understood that this is for illustrative purposes only since the unit for eliminating the emission of objectionable waste products of combustion to the atmosphere can be employed equally as well with all types of burning equipment.

The heating apparatus disclosed in my aforementioned U.S. Patent No. 3,044,460 is one which functions not only as an incinerator to burn trash, or functions as a heater of a conventional type, but also has an additional function of providing heat through a heat exchange relationship with an associate heat exchanger and the waste products of combustion from the fire burning zone which may be utilized to heat any given area.

The heating apparatus 30, as illustrated in FIGS. 4–7, includes a main body housing 31 made of cast iron, or any other suitable material, which functions as a fire burning area and comprises front and back wall members 32 and 33 and opposed side wall members 34 and 35. The front wall member 32, as illustrated, is of a height less than the back wall member 33 and the side wall members 34 and 35 to provide access to the housing in a manner to be more fully described hereinafter. The side wall members 34 and 35 are shown as being spaced inwardly from the respective free ends of the front and back wall members 32 and 33 and are secured thereto by welding, riveting, or the like. This construction results in vertically extending side portions 36 and 37 extending outwardly on each end of the body housing 31. Side cover members 38 and 39 are secured to the side portions 36 and 37 on each side of the housing in spaced relationship thereto at a point above the bottom end of the side portions 36 and 37 by means of welding, brazing, riveting, or the like. In connection with this, it is to be noted that the top edge of the cover member 38 stops short of the top edge of the side wall member 34 and is provided with a slight, outwardly flared lip. Similarly, the top edge of the cover member 39 extends above the top edge of the side wall member 35 and is provided with an inwardly flared lip portion. This construction defines a bottom entrance and a spaced passageway on either side of the housing 31 to enable air to be drawn in at the bottom of the body housing and to pass upwardly on either side thereof, and be directed in a manner to facilitate heat transfer in a manner to be more fully described hereinafter.

The front wall member 32 is provided with a large rectangular opening at its bottom edge thereof through which ashes and the like will be removed. The opening is framed by a door plate frame 42 which is secured around the perimeter of the front wall member 32 by riveting, welding, or the like. The door frame member 40 is provided with a central rectangular opening which is covered by a door 41 which is hingedly secured thereto by means of a hinge construction 42 to provide access into the housing body 31 to remove ashes and the like therefrom. The opposite end of the door 41 is provided with a handle and latch mechanism 43 to enable the door to be retained in a closed state normally. The door 41 is provided with a draft door 44 centrally positioned adjacent its lower edge by any suitable means which is operable to provide any desired degree of draft for the housing body 31 during a burning operation therein.

The top transverse edge of the front wall member 32 terminates at a point below that of the back wall member 33 and the side wall members 34 and 35, as hereinbefore indicated. The front portions of the side wall members 34 and 35 lying above the front wall member 32 are inwardly inclined, defining a rectangular opening into the housing which lies in inclined relationship to the remainder of the body housing for feeding material to be burned thereinto. The inclined opening is covered by a large feed door 45 which is secured to the top edge of the housing body 31 by means of a rod and hinge construction 46. The lower end of the feed door 45 is provided with a latch and handle mechanism 47 to provide means to lock the feed door 45 in position and yet readily detachable to enable material to be fed into the body housing 31 for burning.

The back wall member 33, as illustrated, may be provided with a back cover member 48 which is secured thereto in spaced relation along its side edges by means of side flange portions by welding, riveting, and the like. The bottom edge of the back cover member 48 is spaced above the bottom edge of the back wall member 33 to provide a vertical passageway for air in the same manner and for the same purpose as the side cover members 38 and 39.

It will be found advantageous to employ stainless steel in the construction of the main body housing 31 although it is to be clearly understood that any suitable metal of a gauge sufficient to satisfy the needed requirements may be employed. The ash door 41 and the feed door 45, and the transversely extending housing 60, are preferably made of heavy gauge cast iron in order to insure a sturdiness and long wear to the construction.

The back cover member 48 is provided along its bottom edge with an outwardly extending rectangular frame member 49 which is adapted to receive, in this illustrative embodiment of the invention, a gun type oil burner generally designated by reference numeral 50. The burner 50 is positioned so as to be movable back and forth along the frame member 49 so as to enable the burner 50 to be completely withdrawn from the body housing 31. The back wall member 33 and the cover member 48 are each provided with complementary circular openings 51 and 52 through which the gun portion of the burner 50 will pass into the fire burning area of the housing 31. The inside surface of the back wall member 33, and the outside surface of the back cover member 48, as shown in FIG. 4, are each provided with spaced parallel slots 53 and 54, respectively, which extend on opposed sides of the openings 51 and 52. A cover plate 55 is slidably positioned within the spaced parallel slot portion 53 of the end wall member 33 and is adapted to slide therebetween to cover the opening 51 upon actuation of the cover plate handle 56. Similarly, the spaced slot portion 54 is provided with a cover plate 57 which is manually operable to close the opening 54 upon withdrawal of the burner 50. This will enable the main body housing 31 to be completely enclosed when oil is not being used as the fuel. That is to say, withdrawing the oil burner 50 rearwardly on the frame 49 will result in a withdrawing of the burner gun from the openings 51 and 52. Pushing the cover handle member 56 inwardly results in the cover plate 55 moving along the slots 53 to cover the opening 51. The manual operation of the cover plate 57 completely seals the unit.

The top cover member 58 of the body housing 31 is provided with a pair of circular openings into which outlet pipes 59 are positioned. The top free ends of the pipes 59 are secured to a transversely extending heat-exchange housing generally designated by reference numeral 60, through which the heat and smoke from the main body housing 31 will pass and be dissipated and carried off in a manner to be more fully described hereinafter. The transversely extending housing 60 is covered by a shield 61 which is secured at one end to the top end of the housing cover member 48 and is bent forwardly around the heat-exchange housing 60 in spaced relationship thereto and stopping short of the top portion 58 of the housing 31. The shield 61 is held in spaced relationship from the housing 60 by means of spacer strips 62 from a circumferential axial passageway between the shield 61 and the housing 60.

The heat exchanger housing 60 comprises a central cylindrical outer shell body 63 of heavy gauge metal which is connected to the spaced outlet pipes 59 in transverse relationship with respect thereto. An inner central cylindrical shell body 64 similarly made of heavy gauge metal is detachably positioned within the outer shell body 63 in spaced relationship. This construction defines a tubular member having a central passageway extending therethrough. The association of the outer and inner shell bodies 63 and 64 results in an air-tight area between the two bodies, with the exception of the two inlet openings in the outer shell body 63 to receive inlet pipes 59, and the outlet opening in the outer shell body 63 functions as an outlet for the waste products of combustion. The forward end of the inner shell body 64 is provided with an outwardly flaring rim portion 65, with the outward terminal end of the flared rim portion 65 provided with a reversely turned perimetral flange portion 66 forming a lip to receive the circular peripheral end of the outer shell body 63. The opposite end of the outer shell body 63 is provided with inwardly inclined rim portion 67, which, in turn, is provided with a peripheral flange portion to receive the opposite terminal end of the inner shell body 64.

The inner shell body 64 is preferably readily detachable from the outer shell body 63 to enable the units to be more easily cleaned from collected carbon and the like in a manner to be more fully described hereinafter. To separate the tubular member, the inner shell body 64 is merely pulled outwardly, thus freeing the perimetral flange portion 66 from one end of the outer shell body 63 and at the same time freeing the opposite terminal end of the inner shell body 64 from the flange portion of the outer shell body 63. To assemble the inner shell body 64 to the outer shell body 63, the former is inserted in the pipe until its forward terminal end engages the flange portion of the outer shell portion 63. Simultaneously when this occurs the flange portion 66 of the inner shell body 64 tightly engages the terminal end of the outer shell body 63, thus locking the bodies in air-tight relationship. While this is the preferred construction, it is to be understood that the inner and outer shell bodies 64 and 63 may be permanently secured to one another in spaced relationship.

The inner shell body 64 is provided with a plurality of angularly disposed baffle plates 68, 69, 70, and 71 on the outside surface of the inner shell body 64, and are so positioned with relationship to the inlet openings 59 and the opposed outlet openings of the air-tight area between the inner and outer shell bodies 64 and 63 so as to provide a controlled, tortuous passageway for the smoke and heat to travel as it comes from the main body housing 31, thereby insuring a proper draft and more efficient burning as well as providing an excellent heat transfer relationship between the elements. The baffle plates 68, 69, 70 and 71 have a height such that the outer edge of each baffle plate will form substantially a seal with the inner surface of the outer shell body 63 to insure the necessary controlled passageways for the smoke.

The baffle plates 68 and 69 are curved around the lower half of the inner shell body 64 and extend upwardly in inclined relationship around the inner shell body 64 on either side thereof to a point short of the top surface, leaving a passageway at the top of the inner shell body 64 at opposite ends thereof. The baffle plates 68 and 69 are inclined downwardly in the direction of one another adjacent opposite ends of the inner shell body 64, with the lower terminus of each baffle plate ending just above the inner inside edge of each of the outlet pipes 59 and extending around and upwardly therefrom in inclined relationship to force the smoke from each of the outlet pipes 59 upwardly and outwardly to the passageway formed at the top surface of the shell body 64 adjacent each end thereof.

The baffle plates 70 and 71 are curved around the upper half of the inner shell body 64 and are each spaced inwardly from the baffle plates 68 and 69, and are inclined such that they are in substantially parallel relationship with the baffle plates 68 and 69. Each free end of the baffle plates 70 and 71 terminates at a point about midway on each side of the inner shell body 64, with each end of the baffles being spaced below and in substantial alignment with the outside edge of the exhaust outlet opening, thereby forming a spaced vertical outlet passageway for the smoke and gases. The arrangement of the baffle plates 68, 69, 70 and 71 is such that the smoke passing upwardly from each of the outlet pipes 59 will be carried outwardly and upwardly on either side of the inner shell body 64 by means of the baffle plates 68 and 69, and pass through the formed passageway of each top surface. The smoke will then strike the top surface of each of the baffle plates 70 and 71 and will be directed downwardly and inwardly on either side of the inner shell body 64 until the smoke reaches the vertically formed passageway. The smoke will then pass upwardly through the exhaust outlet of the outer shell body 63.

Another advantage of this construction is that with this form of the heat exchanger housing 60, cleaning can be accomplished in a relatively short time. To clean the heat exchanger housing 60, the inner shell body 64 is merely pulled outwardly from the outer shell body 63. This operation results in the inclined baffle plates 68, 69, 70 and 71 scraping the inner surfaces of the outer shell body 63, thereby removing carbon and the like during the withdrawing operation. The inner shell body 64 is then cleaned by washing or the like, with the inner surface of the outer shell body 63 being wiped clean. The inner shell body 64 is then inserted in the same manner as hereinbefore indicated.

While any suitable baffle plate construction may be employed to devide the baffle plates 68, 69, 70 and 71, a particular and preferred construction consists of angled sheet metal in which the base thereof will be secured to the outer surface of the inner shell body 64. The vertical portion of the angled metal, which will function as the baffle plates, will be provided with a plurality of vertical slits such that when the sheet metal is curved to the contour of the inner shell body 64, the slit portion of the sheet metal will be expanded, resulting in a plurality of small, V-shaped notches. The advantage of this particular arrangement is that it will provide a plurality of small openings through which heat will seep to heat the opposite side thereof and will facilitate the passage of smoke and heat through the tortuous path hereinbefore defined. While this is a particular and preferred construction, it is to be clearly understood that any suitable baffle plate construction may be employed which will result in the formation of the desired tortuous path.

A blower fan 72 is positioned at one end of the transverse heat exchanger housing 60 for blowing air therethrough in transverse relationship to the path of the heat, gases and smoke to pick up heat generated in heat exchange relationship for blowing same in a hot state into the area to be warmed. The diameter of the fan blade of the blower 72 is greater than the diameter of the outer shell body 63 and just slightly less than the inside diameter of the housing shield 61. This arrangement insures a blowing of air not only through the inner passageway of the inner shell body 64, but also around the outside surface of the outer shell body 63, thereby insuring excellent heat exchange relationship. If desired, a duct structure (not shown) may be connected to the discharge end of the heat exchanger housing 60 for controlled discharge of the hot air. The blower 72 is centrally positioned and secured to a heavy metal screen 73 which, in turn, is tightly positioned at one end of the housing shield 61. The blower 72 is actuated by electric power, not shown, and is so timed as to be operable only during actual operation of the heating unit 30.

While the heat exchanger housing assembly 60 is a particular and preferred one, it is to be clearly understood that other heat exchanger means may be employed. For example, radiator type heat exchangers may be positioned over each of the firebox outlets 59, with each heat exchanger being provided with a blower. In this type of operation, the hot gases will pass up through each heat exchanger, transferring it heat thereto, with air being blown through the heat exchanger where it is warmed by the hot gases and then passed outwardly through the opposite end of the heat exchanger to provide the necessary heat.

As hereinbefore indicated, the side cover members 38 and 39 form vertical passageways, respectively, with the side wall members 34 and 35 through which air will be upwardly drawn. As hereinbefore indicated, the positioning of the inwardly flared lip portion 74 on the top transverse edge of the shield member 39 is in close proximity to the blower 72 and above the top surface of the main body housing 31, with the shield member 38 having its top transverse edge slightly spaced below the top edge of the body housing 31. This construction results in a suction effect in each side passageway, thus drawing air upwardly on either side of the main body housing 31. The air thus drawn upwardly is heated in heat exchange relationship with the body housing 31 and is drawn into the blower air-stream, thereby increasing the heating efficiency of the unit. The air passing upwardly between the housing shield 39 and the side wall member 35 is blown completely around the heat exchange housing 60 by passing through the area existing between the heat exchanger housing 60 and the housing shield 61. The air being drawn upwardly between the side shield member 38 and the side wall member 34 passes upwardly and is drawn directly into the horizontally moving air-stream at the discharge end of the heat exchanger housing 60.

Air is also blown upwardly through the spaced passageway formed by the back cover member 48 and the back wall member 33 in the same way as the air is drawn upwardly along each of the side passageways formed on the sides of the unit 30. To facilitate the drawing upwardly of the air through the formed back passageway, and to direct the efficient flow of the air into the created blown air-stream to assist in providing the desired heat, a plurality of inclined baffle plates 75 are secured to the inside surfaces of the housing shield 61 in spaced relationship immediately adjacent the top surface of the main body housing 31. The baffle plates 75 are slightly wider than the width of the back passageway to insure the air being drawn into engagement therewith. The baffle plates 75 are inclined in the direction of the air flow, thereby causing the air to be drawn upwardly into contact with the inclined surfaces and into the created air-stream. The positioning of the baffle plates 75 creates, in conjunction with the blower 72, a venturi effect which materially aids in the efficiency of the unit 30.

To provide a constant heat source to facilitate the transfer of heat generated in the fire area of the main body housing 31 to the air-stream created by the blower 72, a removable heat trap member 45 is centrally positioned within the inner shell body 41 in spaced relationship thereto. The heat trap member 76 is in the form of an elongated tube 77, with each end thereof enclosed by a pointed nose portion 78. Inlet means 79 and 80 are provided at spaced points on the under surface of the heat trap member 76 and in alignment with the inlet means 59. This construction results in the formation of a closed circuit heat trap in which heat will be continually rising virtually directly from the fire area. Thus as air is blown through the transverse heat exchanger housing 60, the air will be continually heated by passage over the heat trap member 76.

Reference is now to be had to FIGS. 6 and 7 wherein the internal construction of the illustrative embodiment of the heater construction just described, made in accordance with the present invention, is shown. The main body housing 31 is provided with inclined support portions 81 which are associated with a pair of vertical grate supporting legs 82. A grate member 83 is supported by the grate supporting legs 82 at a distance sufficiently high to enable ashes to be withdrawn through the ash collecting door 41. The supporting legs 82 are spaced from one another for a distance just slightly less than the width of the ash-receiving door 41 through which the grate 83 may be withdrawn or replaced. The grate 83 should lay in a position at a point below the opening 51 in the end wall member 33 in order that a firebox supported thereon will be efficiently positioned with respect to the oil burner 50.

As shown in FIG. 6, an oil burner 50, for the purposes of illustration, is shown in operable position with oil to be used as the fuel. However, it is to be clearly understood that a gun type gas burner can be used equally as well and in the same manner as an oil burner. When the heating unit 30 is to be used as an oil burner or gas burner, a firebox 84 is positioned on the grate 83 with the gun of the burner 50 entering thereinto. The firebox 84 may be made of any suitable material, but preferably consists of a rectangular, stainless steel box provided with legs 85 which rest on the grate 83, with the firebox being in substantially vertical alignment with the smoke and heat discharge outlets 59 of the main body housing 31.

If the heating apparatus 30 is to be employed as an incinerator, or if coal or similar solid fuel is to be used as the heating medium, either hand fed or stoker fed, the firebox 84 and the burner 50 are not to be used in the main body housing 31. In converting from oil or gas to an incinerator or other solid fuel burner, the firebox 84 is withdrawn from the main body housing 31 through the feed door 45 for storage until needed. The oil or gas burner 50 is rearwardly withdrawn on the support frame 49, drawing the gun portion of the burner completely out of the heating unit. Handle 56 is then pushed inwardly, resulting in the cover plate 55 sealing the opening 51. Similarly, the cover plate 57 is manually operated to close the opening in the rear shield 48. The unit 10 is now ready for use as an incinerator.

The inner stack member 11 has its lower end extending through an opening in the cover member 61 and into the exhaust outlet opening 86 in the outer shell body 63 of the heat exchanger housing 60. The inner stack member 11 may be secured to the outer shell body 63 in any suitable manner, such as, for example, press fitting, welding, bolting, or the like, and will extend upwardly therefrom in transverse relationship thereto in the manner of a normal stack or chimney. The air blower 12 is secured to the inner stack member above the heat exchange housing 60 and is in association with the air guide member 13 in a manner hereinbefore described. Similarly, fuel cup 19 and the fuel nozzle 20 are associated with the air guide member 13 in the manner likewise hereinbefore described. The igniter member 22 extends through the inner stack member 11 and into the fuel cup 19 to function as the means for igniting the fuel dispensed from the nozzle member 20. The outer stack member 24 is secured to the inner stack member 11 in circumferentially spaced relationship therewith by means of thin web bands 25, with the outer stack member 24 extending above and beyond the terminal end of the inner stack member 11.

In the operation of the heating apparatus 30 just described, if rubbish is to be burned, the heating unit 30 will require no firebox but will merely have the grate 83 present therein, with the openings 51 and 53 in the rear walls 33 and 48 being closed. The material to be burned is then fed into the feed door 45 and ignited to effect the burning thereof. The blower 72 is set into operation and the heat and smoke generated by such burning will be passed into the heat exchanger housing 60 and heat trap member 75 where it will continuously heat the air being blown therethrough in transverse relationship to the flow of the smoke and the heat from the fire burning area. The heat and smoke which constitute the waste products of combustion follow the tortuous path in the heat exchanger housing 60 in the manner hereinbefore described, and will reach the exit end or opening 86 on the top surface of the outer shell body 63.

Such waste products of combustion will then rise upwardly through the inner stack member 11, with the air blower 12, then being in operation, assisting in the upward movement of such waste products of combustion. The waste products of combustion will be admixed with air passing into the inner stack member 11 through the air guide member 13, and will be ignited by the fuel being fed into the fuel cup 19 through the fuel nozzle 20 which, in turn, was ignited by the igniter means 22. The burning of the mixture of air and waste products of combustion creates a secondary combustion zone in which the waste products of combustion are further burned, with such burning resulting in an extremely high temperature at the secondary combustion zone. As hereinbefore indicated, it is preferred that the fuel be continuously fed into the fuel cup 19 and be continuously burned, thereby insuring an igniting flame for the mixture of air and waste products of combustion at all times. However, as has also been indicated, after the stack temperature at the secondary combustion zone has reached such a point that the air mixture will be self-ignited, the fuel feeding may be discontinued.

The waste products of combustion rise upwardly from the secondary combustion zone in the inner stack member 11 and are admixed with the air rising upwardly between the inner stack member 11 and the outer stack member 24. As the air passes upwardly in the formed passageway between the inner stack member 11 and the outer stack member 24, the air will be rapidly heated by the heat transfer relationship with the surface of the inner stack member. Thus when the air mixes with the waste products of combustion from the secondary combustion zone at the exit end of the inner stack member 11, the mixture effects a self-ignition with a corresponding further burning of the remaining waste products of combustion being obtained. This further burning in the third combustion zone results in a substantially complete burning of the remaining waste products of combustion, and the products resulting therefrom will rise upwardly and outwardly through the outer stack member 24 and into the atmosphere in a state which is not objectionable.

Upon completion of the burning of the refuse in the fire burning apparatus 30, and if heat is still desired, the firebox 84 is positioned on the grate 83 and the oil gas burner 50 pushed through the openings 51 and 52 into the firebox 84 and fired to provide the necessary heat. The heat produced from the burning of the gas oil will then pass upwardly in the same manner as hereinbefore described with respect to the rubbish burning, and hot air is blown outwardly through the exchanger housing 60 to provide the desired heat. If oil or gas is not to be employed to provide the necessary heat, the heating unit 30 may be continuously or intermittently fed by coal or like material with no firebox 84 being needed. The adaptability of the heating unit 30 therefore enables the user to continuously have heat to heat any given area, as well as to provide means to dispose of rubbish, and also upon completion of the burning of the rubbish, to readily convert to conventional fuel.

When heat is not required, the heating unit 30 may be merely used as an incinerator to burn refuse and the like. Under such circumstances it will be preferred to have the blower 72 remain at rest thereby directing the greater portion of the heat and smoke upwardly for passage ultimately through the outer stack member 25. Regardless of the material burned or the fuel employed, the waste products of combustion and the subsequent burning thereof in two separate zones of combustion will be the same.

Figure 8:
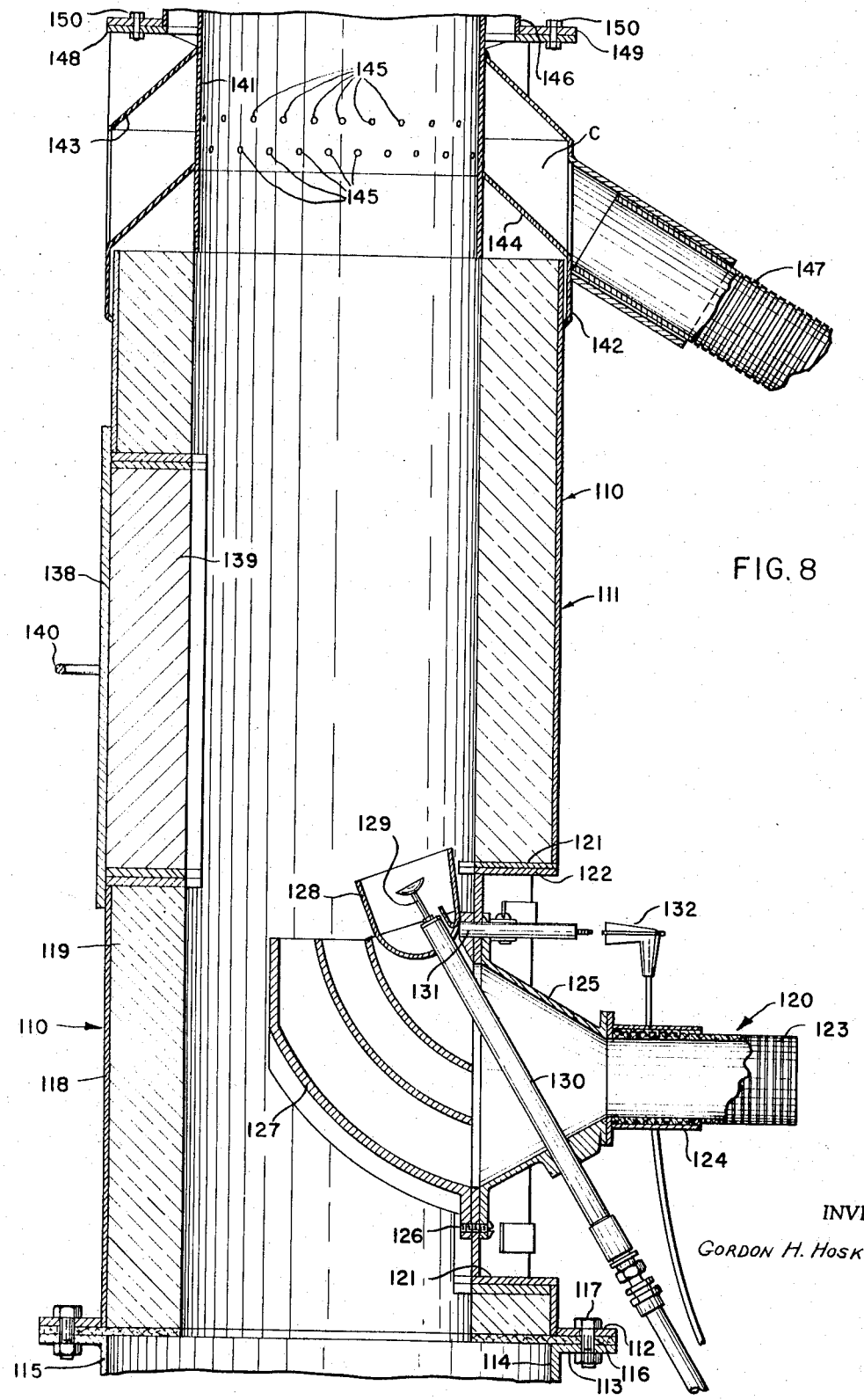
FIG. 8 is an enlarged side elevation in cross-section of another form of stack structure made in accordance with the present invention and illustrating the construction of the lower portion of the inner stack member which will eliminate possible burn-out thereof.

Referring now to FIG. 8, an illustrative embodiment of another form of stack construction which will be found to be of utility in many cases and made in accordance with the present invention is shown therein. This stack construction shown in FIG. 8 will be particularly useful with fire burning apparatus having a large capacity and in which considerable heat is generated and passed off in the waste products of combustion. It has been found in many instances where such high heat is generated, the lower portion of the inner stack member, when made only of metal, is often burned out after a comparatively short period of use. This burning out is caused by the intense heat generated in the lower portion of the inner stack member as a result of the initial burning of the waste products of combustion in this zone. The form of the invention illustrated in FIG. 8 minimizes such burn-out regardless of the amount and intensity of the heat generated in this area.

As illustrated in FIG. 8, an embodiment of the improved form of exhaust stack construction, generally designated by reference numeral 110, is shown therein. The stack construction 110 includes an inner stack member, generally designated by reference numeral 111, which is secured at one end by a flange portion 112 to a flange portion 113 forming a portion of the collar 114 of the fire burning apparatus 115, fragmentarily shown. The collar 114 defines the exit area for the waste products of combustion from the fire burning apparatus. An asbestos gasket 116 is interposed between the flange portions 112 and 113 to insure a tight seal therebetween. The flange portions 112 and 113 may be secured to one another by any suitable means, such as, for example, the nut and bolt arrangement 117, as shown.

The inner stack member 111 includes a lower, outer cylindrical portion 118 which may be made of steel, iron, stainless steel, or any other suitable metal from which exhaust stacks are normally made. Disposed within and enveloped by the outer cylindrical portion 118 is a lower, inner cylindrical portion 119 which is secured to the inner surface of the lower, outer member 118. The inner portion 119 is made of a refractory material of high strength and high heat resistance and defines the area within which the initial burning of the waste products of combustion will occur. The thickness of the inner refractory portion 119 must be sufficient to provide the necessary strength to aid in supporting the stack assembly and to resist the high heat generated therein and yet provide an area of sufficient size to permit adequate burning of the initial burning of the waste products of combustion therein. Suitable examples of refractory materials capable of withstanding the high, intense, and prolonged temperatures encountered in the initial burning zone and providing the necessary strength are fused silica, fire clay, fused alumina, fused refractory materials, kaolin refractory materials, magnesite, mulite, refractory silicon, carbides, etc.

The lower rear portion of the lower, inner stack member 111 just above the means connecting it to the fire burning apparatus 115 is provided with a cut out area in which the air and fuel unit for initiating the first burning of the waste products of combustion and generally designated by reference numeral 120 is seated. As illustrated, the cut out portion of the lower portion of the inner stack member had the outer metal portion 118 bent inwardly forming a flange portion 121 which is adapted to receive the flange portion of mounting plate 122. The mounting plate through its flange may be connected to the flange portion 121 by any suitable means, such as, for example, welding, bolting, or the like. The flanged mounting plate 122 has a large central opening positioned therein which will function as the means by which air which supports the initial secondary burning of the waste products of combustion will enter.

The air and gas unit 120 includes an air line 123 connected at one end to an air blower (not shown). The opposite end of the air line 123 is secured to a collar 124 connected to a bell mouth discharge element 125, which is secured to the mounting plate 122 by means of screws 126 and surrounds the cut out area of the mounting plate 122. An air guide member 127 is secured to the opposite and inner face of the mounting plate 122 in aligned relationship with the bell mouth element 125 by means of the screws 126. The air guide member 127 is employed in association with the air line 123 and air blower fan to control the direction of the air drawn into the inner stack member 111 and to aid in the creation of the draft of the waste products of combustion as well as aiding in the further burning of the waste products of combustion. The air guide member 127 thus functions in the same manner as the air guide member 13 shown and described hereinbefore in FIGS. 1 and 2.

A small cylindrical fuel cup 128 is mounted to the mounting plate 122 by any suitable means and rests on the top surface of the air guide member 127 at the air exit end thereof. The fuel cup 128 is made in a similar manner and serves the same function as the fuel cup 19 shown hereinbefore in FIGS. 1 and 2. A fuel nozzle 129 for injecting fuel within the fuel cup 128 is mounted in the bottom surface of the fuel cup and extends upwardly therein. The fuel nozzle 129 is connected to a fuel line 130 which passes through the cut out area of the mounting plate 122 and through a side wall of the bell mouth element 125 and is connected to a fuel source (not shown). The fuel nozzle 129 functions in the same manner and for the same purpose as the fuel nozzle 20 shown and described hereinbefore in FIGS. 1 and 2.

A fuel igniter member 131 is mounted to the mounting plate 122 and extends through the wall thereof and through the wall of the fuel cup 128. The fuel igniter 131 functions in the same manner and for the same purpose as the fuel igniter 22 shown in FIGS. 1 and 2, in that it serves to ignite the fuel to start the burning of the waste products of combustion passing from the fire burning apparatus. The opposite end of the fuel igniter 131 is connected to a power line 132, which, in turn, is connected to a power source (not shown).

The construction just described results in the secondary combustion zone in which the waste products of combustion passing through the outlet end of the fire burning area proper will be admixed with air being drawn thereinto and which will be burned in the comparatively small area by the fuel. This secondary combustion zone thus effects a further burning of the waste products of combustion with fresh oxygen. Thus, the unit works in the same manner and for the same purpose as the air guide means, fuel means, and igniter means shown and described hereinbefore in FIGS. 1 and 2.

The opposite side of the inner stack member 111 above the air and fuel inlet means may be provided, as illustrated, with a cut-out in which a door 138 is seated in tight, sealed relation therein. The door 138 is provided with a refractory backing 139 and outside handle 140 by which the door may be removed. The purpose of the door is to permit access into the inner stack member 111 primarily for service of the air, fuel, and ignition means.

The upper free end of the lower inner and outer portions 118 and 119 of the inner stack member 111 is connected to the bottom part of the cylindrical upper portion 141 of the inner stack member 111 by any suitable means. The upper portion 141 may be made of any suitable metal of the type used in making the lower, outer portion 118 and has an internal diameter generally corresponding to the diameter of the lower, inner refractory portion 119. As illustrated, the lower end of upper portion 141 engages in aligned relation with the upper end of the refractory portion 119 in a press-fit relationship.

To aid in the support of the upper stack portion to the lower stack portion, a heavy gauge circular collar 142 is secured by any suitable means, such as, for example, welding, bolting, or the like, to the outside surface of the upper end of the lower portion 118 of the inner stack member 111. The collar 142 has upper and lower circular support portions 143 and 144 which are vertically spaced with respect to one another and are inwardly and upwardly inclined to be secured by any suitable means to the upper portion 141 of the inner stack member 111 at a point above the upper free end of the lower portions 118 and 119 of the inner stack member 111.

The collar 142 and its associated support portions 143 and 144, in addition to providing reinforcement and support for the association and connecting together of the upper portion 141 and the lower portions 118 and 119 of the inner stack member 111, also provide a circular air chamber C. The air chamber C is formed between the support portions 143 and 144 and is inclined upwardly in the direction of the upper portion 141 of the inner stack member 111. A plurality of small holes 145 are formed circumferentially around the upper portion 141 in the area between the engagement of the upper and lower support portions 143 and 144 to the upper stack portion 141. The holes 145 are small in diameter, i.e., 3/16" in diameter, and are drilled upwardly in inclined relationship to the upper stack portion 141 such that air passing therethrough will be directed upwardly and inwardly. The function of the air holes 145 is to permit the passage of air into the inner stack 111 at a point above the initial burning of the waste products of combustion so as to intensify the burning and to suppress the length of the flame of the burning waste products of combustion. This will increase the efficiency of the larger units and will also increase the heat generated in this area, thereby intensifying the area of heat transfer between the inner stack 111 and the outer stack 146.

To provide means for imparting the air into the inner, upper stack 141 through the holes 145, an opening is provided in the collar 142 between the upper and lower support portions 143 and 144 providing an entrance into the air chamber C. An air tube 147 is connected at one end to the opening in the collar 141 with the other end connected to an air blower (not shown).

The outer stack member 146 may be of the same construction as the outer stack member 25 described and illustrated hereinbefore with other forms of the invention, and may, if desired, be secured thereto in the same manner. As illustrated in FIG. 8, another form of mounting means may be used, if desired. As shown, a plurality of angled support flanges 148 are secured in circumferentially spaced relation around the collar member 142 above the upper support member 144 providing spaced connecting portions in right angled relationship to the inner stack member 111. The bottom free end of the outer stack member 146 is provided with circumferentially spaced flange portions 149 corresponding to the flange portions 148. The flange portions 148 and 149 are secured to one another by means of bolts 150.

The form of the invention shown in FIG. 8 defines a stack construction which functions in the same manner as the other forms of the invention described hereinbefore. In this modified form, there is less likelihood of burning out of the lower portion of the inner stack member just above where the initial burning of the waste products of combustion takes place. The lower portion of the inner stack member utilizing the refractory material minimizes and reduces the possibility of such burnout. Further, in this embodiment a controlled air feed means is provided which will function as a heat intensifier and flame suppressor, thereby increasing the overall efficiency of the stack construction by insuring a greater heat transfer between the inner and outer stack members.

No description has been given relative to the electrical controls for the fuel feeding means and the like which will be employed in the present invention. However, such elements are quite conventional and may be provided at any suitable point on the unit as desired.

While the foregoing description of the unit, which effects a substantially complete and further burning of the waste products of combustion arising from the fire burning unit, has been described with respect to a particular form of burning apparatus, it is to be clearly understood that other fire burning apparatus may be employed equally as well as the present unit.

The unit has also been shown herein in association with a heat exchanger unit. While it is preferred from a general efficiency operation and for dual functionality to employ a heat exchanger with the unit, it is to be clearly understood that the unit constituting the present invention may be employed equally as well by mounting same directly to the outlet end of the stove burner or other fire burning apparatus.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. Apparatus for permitting the emission of waste products of combustion to the atmosphere in an unobjectionable state comprising; an inner exhaust smoke stack member adapted to be connected to a fire burning apparatus, said inner member forming a continuous passageway for the passing of waste products of combustion therethrough, said inner stack member including a lower portion adapted to be connected to a fire burning apparatus and having a refractory lining therewith, and a metal upper portion secured to the upper end of said lower portion, air supply means secured to said lower portion of said inner stack member adjacent the end to be connected to the fire burning apparatus to impart air thereinto, fuel dispensing means for imparting fuel into said inner stack member immediately adjacent said air supply means, ignition means for igniting said fuel to effect an initial burning of the waste products of combustion in the lower portion of said inner stack member; and an outer exhaust stack member secured to the upper portion of said inner stack member in circumferentially spaced, enveloping relationship, with at least that part of said inner stack member which is enveloped by said outer stack member being made of a material having high heat conductivity, the upper free end of said outer stack member being spaced well beyond the terminal free end of said inner stack member, the lower part of said upper portion of the inner stack member just above the upper end of the lower portion of the inner stack member and below the bottom free end of the outer stack member being provided with a plurality of upwardly inclined small apertures therearound, air supply means associated with said inner stack member for passing air through said apertures, said circumferentially spaced relationship of said outer stack member to said inner stack member forming a continuous, elongated air passageway in substantially sealed relationship therebetween of substantial length along which air will be drawn therethrough from the end of said outer stack member adjacent said air supply means and will be heated in heat exchange relationship with said inner stack member, said heated air mixing with the waste products of combustion emerging from the free end of said inner stack member to effect a self-ignition of such formed mixture to further burn the waste products of combustion within the outer stack member.

2. Apparatus for permitting the emission of waste products of combustion in accordance with claim 1, wherein said lower portion of said inner stack member comprises an outer, metal, circular portion and an inner circular portion of refractory material secured to said outer metal portion.

References Cited
UNITED STATES PATENTS

| | | | |
|---|---|---|---|
| 2,879,862 | 3/1959 | Burden | 23—277 |
| 3,248,178 | 4/1966 | Hoskinson | 23—277 |

JAMES H. TAYMAN, Jr., *Primary Examiner.*